US011656001B2

(12) United States Patent
Liu et al.

(10) Patent No.: US 11,656,001 B2
(45) Date of Patent: May 23, 2023

(54) SOLAR HEAT COLLECTION DEVICE FOR NEAR-ZERO ENERGY CONSUMPTION COMMUNITY

(71) Applicants: NORTH CHINA ELECTRIC POWER UNIVERSITY(BAODING), Baoding (CN); China Academy of Building Research, Beijing (CN)

(72) Inventors: Zhijian Liu, Baoding (CN); Shicong Zhang, Beijing (CN); Guangya Jin, Baoding (CN); Xinyan Yang, Beijing (CN); Changping Liu, Beijing (CN)

( * ) Notice: Subject to any disclaimer, the term of this patent is extended or adjusted under 35 U.S.C. 154(b) by 395 days.

(21) Appl. No.: 17/138,870

(22) Filed: Dec. 30, 2020

(65) Prior Publication Data

US 2022/0178587 A1 Jun. 9, 2022

(30) Foreign Application Priority Data

Dec. 9, 2020 (CN) .......................... 202011447660.6

(51) Int. Cl.
*F24S 30/425* (2018.01)
*F24S 40/20* (2018.01)
*F24S 30/00* (2018.01)

(52) U.S. Cl.
CPC ............. *F24S 30/425* (2018.05); *F24S 40/20* (2018.05); *F24S 2030/11* (2018.05); *F24S 2030/134* (2018.05); *F24S 2030/145* (2018.05); *F24S 2030/18* (2018.05); *F24S 2030/19* (2018.05)

(58) Field of Classification Search
CPC ................. F24S 30/425; F24S 2030/11; F24S 2030/134; F24S 2030/145; F24S 2030/18; F24S 2030/19; F24S 50/20
See application file for complete search history.

(56) References Cited

U.S. PATENT DOCUMENTS

| 4,365,616 | A | * | 12/1982 | Vandenberg | ............ | F24S 23/80 |
| | | | | | | 126/690 |
| 5,253,637 | A | * | 10/1993 | Maiden | ................. | F24S 30/452 |
| | | | | | | 353/3 |
| 2010/0051021 | A1 | * | 3/2010 | Kunz | ....................... | F24S 23/74 |
| | | | | | | 126/694 |
| 2019/0372514 | A1 | * | 12/2019 | Almy | .................... | F24S 25/617 |

* cited by examiner

*Primary Examiner* — David J Laux (57) ABSTRACT

A solar heat collection device for a near-zero energy consumption community, including a heat collection frame, a heat collector, a center of gravity adjusting frame and a self-adaptive angle adjusting assembly, wherein the heat collector is rotatably disposed on the heat collection frame through the self-adaptive angle adjusting assembly; the center of gravity adjusting frame is fixed on one side of the bottom of the heat collector; the self-adaptive angle adjusting assembly includes a fixing cylinder, an angle adjusting cylinder, an inner cylinder and a damping adjusting assembly; the inner cylinder is coaxially fixed inside the angle adjusting cylinder; two ends of the angle adjusting cylinder are respectively coaxially and rotatably connected with the fixing cylinder; and the damping adjusting assembly is arranged between the angle adjusting cylinder and the fixing cylinder.

10 Claims, 6 Drawing Sheets

SOLAR HEAT COLLECTION DEVICE FOR NEAR-ZERO ENERGY CONSUMPTION COMMUNITY

CROSS-REFERENCE TO RELATED APPLICATIONS

The application claims priority to Chinese patent application No. 202011447660.6, filed on Dec. 9, 2020, the entire contents of which are incorporated herein by reference.

TECHNICAL FIELD

The present disclosure relates to the technical field of heat collection devices, in particular to a solar heat collection device for a near-zero energy consumption community.

BACKGROUND

During the heating season, toxic gases and smog are often generated due to insufficient coal combustion and other reasons, which seriously affect air quality. The use of coal in communities, in particular, not only affects the surrounding air, but also poses potential safety hazard. In order to reduce the amount of coal used for heating, people have started to use low-temperature solar energy as a clean energy source, and solar heat collection devices have emerged.

Since the heat collection device is placed outdoors, its surface is easily covered with dust and other sundries when in use. Failure to clean up in time will easily affect the use effect of the heat collection device, resulting in low heat collection efficiency, which in turn will affect the subsequent use effect. Further, most of the existing heat collection devices are fixed type, which cannot change with the angle of the sun's irradiation, and the heat collection capacity is low.

Therefore, it is necessary to provide a solar heat collection device for a near-zero energy consumption community to solve the problems raised in the background art.

SUMMARY

In order to achieve the above objectives, the present disclosure provides the following technical solutions: a solar heat collection device for a near-zero energy consumption community, comprising a heat collection frame, a heat collector, a center of gravity adjusting frame and a self-adaptive angle adjusting assembly, wherein the heat collector is rotatably arranged on the heat collection frame through the self-adaptive angle adjusting assembly;

the center of gravity adjusting frame is fixed on one side of the bottom of the heat collector, so that the heat collector is driven to deflect by the center of gravity adjusting frame without interference;

the self-adaptive angle adjusting assembly comprises a fixing cylinder, an angle adjusting cylinder, an inner cylinder and a damping adjusting assembly; wherein the inner cylinder is coaxially fixed inside the angle adjusting cylinder; two ends of the angle adjusting cylinder are respectively coaxially and rotatably connected with the fixing cylinder; the angle adjusting cylinder is also connected with the heat collector; and the damping adjusting assembly is arranged between the angle adjusting cylinder and the fixing cylinder;

when collecting heat, the side, close to the center of gravity adjusting frame, of the heat collector is raised and placed facing the sun, so that the heat collector will slowly deflect to an initial state over time; and under the intervention of the damping adjusting assembly, the angular deflection of the heat collector is suspended in a multi-point mode, so that the heat collector can deflect along with the deflection of the sun, thereby collecting more heat.

Further, in the solar heat collection device for the near-zero energy consumption community, the cleaning guide rails are symmetrically fixed on the heat collector, and a through groove is opened in the cleaning guide rail; an arc-shaped rack with the same track as the cleaning guide rail is arranged in the through groove; a gear is meshed on the arc-shaped rack, and a cleaning roller is fixed between two sets of gears.

Further, in the solar heat collection device for the near-zero energy consumption community, one gear is connected with an output end of a micro motor, and the other gear is coaxially and fixedly connected with a limiting disc.

Further, in the solar heat collection device for the near-zero energy consumption community, a limiting guide rail is further arranged on the cleaning guide rail close to the micro motor, a limiting rod is slidably arranged in the limiting guide rail, and the limiting rod is connected with the micro motor.

Further, in the solar heat collection device for the near-zero energy consumption community, the heat collector is further provided with a light gathering pipe which is directly fixed; the light gathering pipe is a transparent pipe body, contained with cleaning liquid therein, and part of the cleaning liquid can be regularly sprayed out on the heat collector.

Further, in the solar heat collection device for the near-zero energy consumption community, the damping adjusting assembly comprises an inflation bag, a brake pad, a damping adjusting cylinder and an inflation fluid injector; wherein two sets of inflation bags are symmetrically attached to the outer surface of the angle adjusting cylinder; an inflation sealing cavity is formed between the angle adjusting cylinder and the inner cylinder; the inflation bags are communicated with the inflation sealing cavity through communication ports formed in the angle adjusting cylinder; and the inflation sealing cavity is filled with liquid, to control the degree of inflation of the inflation bag by the inflation sealing cavity;

the middle position of the inflation sealing cavity is communicated with the damping adjusting cylinder fixed on the angle adjusting cylinder; a sealing plug is slidably arranged in the damping adjusting cylinder, and the sealing plug is connected with the bottom of the damping adjusting cylinder through a return spring, so as to control the inflation degree of the inflation bag through the sliding of the sealing plug.

Further, in the solar heat collection device for the near-zero energy consumption community, one side, close to the return spring, of the damping adjusting cylinder is embedded and communicated with the inflation fluid injector, and the inflation fluid injector can inject or extract the inflation fluid with a thermal inflation coefficient into one side, close to the return spring, of the damping adjusting cylinder, so as to change an initial position of the sealing plug and the amount of the inflation fluid in the damping adjusting cylinder in an initial state.

Further, in the solar heat collection device for the near-zero energy consumption community, further comprising a solar energy intensity detection sensor capable of feeding detection data back to the controller, and the controller is electrically connected with the inflation fluid injector.

Further, in the solar heat collection device for the near-zero energy consumption community, a plurality of sets of resistance-increasing springs are uniformly distributed in the inflation bag; and the outer surface of an end part of the angle adjusting cylinder is attached with a centralizing sleeve arranged to keep off the inflation bag; the inner side of the centralizing sleeve abuts against the outer surface of the angle adjusting cylinder, and the outer side of the centralizing sleeve abuts against the inner surface of the fixing cylinder.

Further, in the solar heat collection device for the near-zero energy consumption community, the outer surface of the angle adjusting cylinder is fixed with a limiting ball I, and the inner surface of the fixing cylinder is fixed with a corresponding limiting ball II; the cooperation of the limiting ball I and the limiting ball II can limit the angle adjusting cylinder to rotate within the range of 0°-90° relative to the fixing cylinder.

Compared with the prior art, the solar heat collection device for a near-zero energy consumption community provided by the present disclosure has the following beneficial effects:

1. When the device is used for collecting heat, the heat collector is manually rotated and adjusted once a day, so that one side, close to the center of gravity adjusting frame, of the heat collector is raised and placed facing the sun, and the heat collector is slowly deflected to the initial state along with time, realizing near-zero energy consumption driving; and under the intervention of the damping adjusting assembly, the angular deflection of the heat collector is suspended in a multi-point mode, so that the heat collector can deflect along with the deflection of the sun, thereby collecting more heat.

2. According to the device, the solar energy intensity detection sensor is used for detecting the illumination intensity. When the illumination intensity of the existing angle position where the heat collector is located is small, the inflation fluid injector is driven to extract part of inflation fluid from the damping adjusting cylinder so as to drive the sealing plug to slide towards the direction of the return spring, which reduces the inflation degree of the inflation bag, and reduces the damping between the inflation bag and the fixing cylinder. In turn, the heat collector enables to continue to deflect under the drive of the center of gravity adjusting frame until the solar energy intensity detection sensor detects that the illumination intensity of the angular position where the heat collector is located is large. Then the inflation fluid injector is driven to inject part of inflation fluid into the damping adjusting cylinder to enable the sealing plug to slide away from the direction of the return spring. In addition, the inflation fluid in the damping adjusting cylinder can be adjusted in small amplitude adaptively under illumination;

3. According to the device, through the rotation of the cleaning roller, dust impurities and the like on the heat collector can be cleaned step by step, reducing the influence of external dust impurities on the heat collecting efficiency, and prolonging the service life.

DETAILED DESCRIPTION OF THE EMBODIMENTS

Referring to FIGS. 1-6, in an embodiment of the present disclosure, a solar heat collection device for a near-zero energy consumption community, includes a heat collection frame 1, a heat collector 2, a center of gravity adjusting frame 3 and a self-adaptive angle adjusting assembly 9. The heat collector 2 is rotatably arranged on the heat collection frame 1 through the self-adaptive angle adjusting assembly 9.

The center of gravity adjusting frame 3 is fixed on one side of the bottom of the heat collector 2, so that the heat collector 2 is driven to deflect by the center of gravity adjusting frame 3 without interference.

The self-adaptive angle adjusting assembly 9 includes a fixing cylinder 91, an angle adjusting cylinder 92, an inner cylinder 93 and a damping adjusting assembly 94. The inner cylinder 93 is coaxially fixed inside the angle adjusting cylinder 92, and two ends of the angle adjusting cylinder 92 are respectively coaxially and rotatably connected with the fixing cylinder 91. The angle adjusting cylinder 92 is also connected with the heat collector 2, and the damping adjusting assembly 94 is arranged between the angle adjusting cylinder 92 and the fixing cylinder 91.

When collecting heat, the side, close to the center of gravity adjusting frame 3, of the heat collector 2 is raised and placed facing the sun, so that the heat collector 2 will slowly deflect to an initial state over time. That is to say, the deflection power of the heat collector 2 comes from the center of gravity adjusting frame 3, and the heat collector 2 only needs to be manually rotated and adjusted once a day, realizing the near-zero energy consumption driving.

Under the intervention of the damping adjusting assembly 94, the angular deflection of the heat collector 2 is suspended in a multi-point mode, so that the heat collector 2 can deflect along with the deflection of the sun, thereby collecting more heat.

Figure 3:
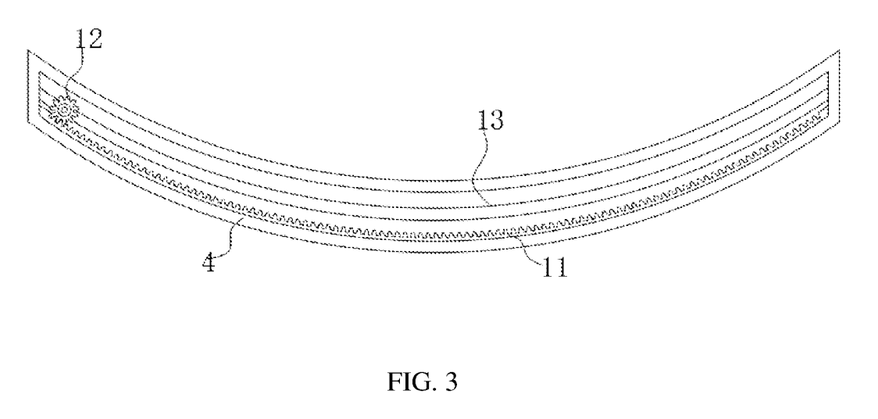
FIG. 3 is a schematic view showing the structure of a cleaning guide rail according to the present disclosure.

In the embodiment, cleaning guide rails 4 are symmetrically fixed on the heat collector 2, and a through groove 5 is formed in the cleaning guide rail 4. An arc-shaped rack 11 with the same track as the cleaning guide rail 4 is arranged in the through groove 5. A gear 12 is meshed on the arc-shaped rack 11, and a cleaning roller 6 is fixed between the two sets of gears 12. Through the rotation of the cleaning roller 6, dust impurities and the like on the heat collector 2 can be cleaned step by step, reducing the influence of external dust impurities on the heat collecting efficiency, and prolonging the service life.

As a preferred embodiment, as shown in FIG. 3, one gear 12 is connected with an output end of the micro motor 8, and the other gear 12 is coaxially and fixedly connected with the limiting disc 7. The micro motor 8 can drive the gear 12 to rotate so as to drive the cleaning roller 6 to rotate and move along the cleaning guide rail 4, thereby realizing comprehensive cleaning of the heat collector 2. Moreover, the provided limiting disc 7 can improve the motion stability of the cleaning roller 6.

As a preferred embodiment, a limiting guide rail (not shown) is further arranged on the cleaning guide rail 4 close to the micro motor 8. A limiting rod is slidably arranged in the limiting guide rail, and the limiting rod is connected with the micro motor 8, thereby improving the moving stability of the motor.

Figure 1:
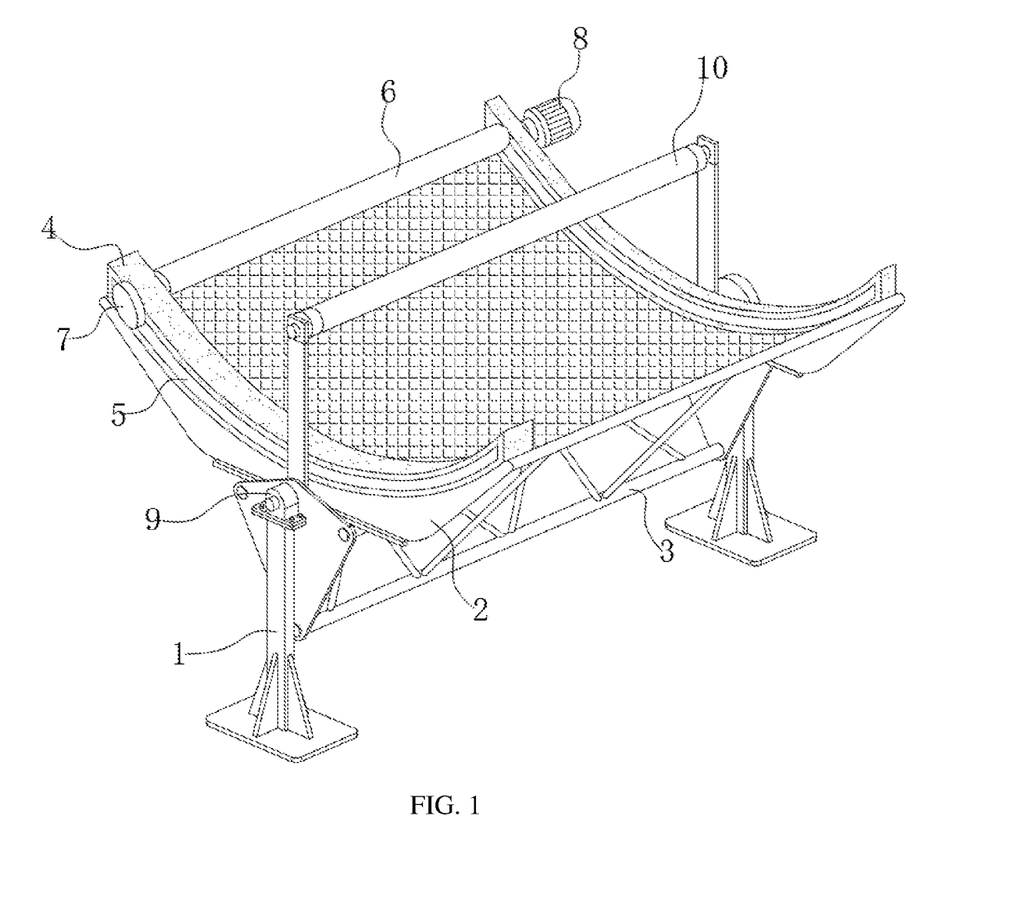
FIG. 1 is a schematic diagram of the three-dimensional structure of the present disclosure.
Figure 2:
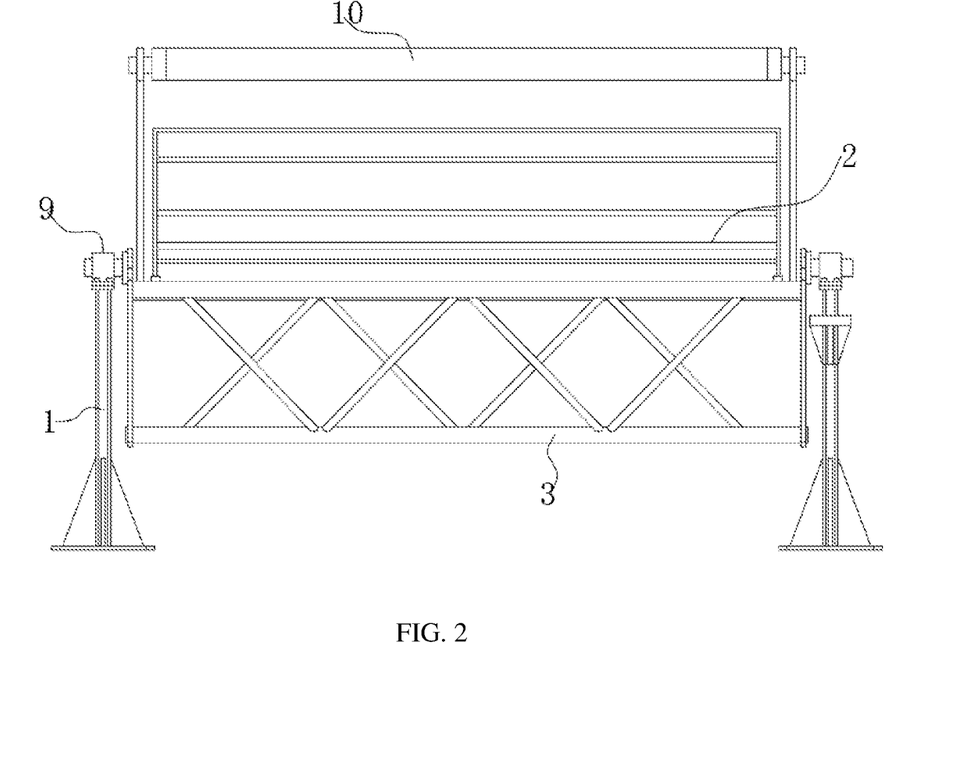
FIG. 2 is a schematic side view of the structure of the present disclosure.

In addition, as shown in FIGS. 1 and 2, the heat collector 2 is further provided with a light gathering pipe 10 which is directly fixed; the light gathering pipe 10 is a transparent pipe body, contained with cleaning liquid therein, and part of the cleaning liquid can be regularly sprayed out on the heat collector 2.

Figure 4:
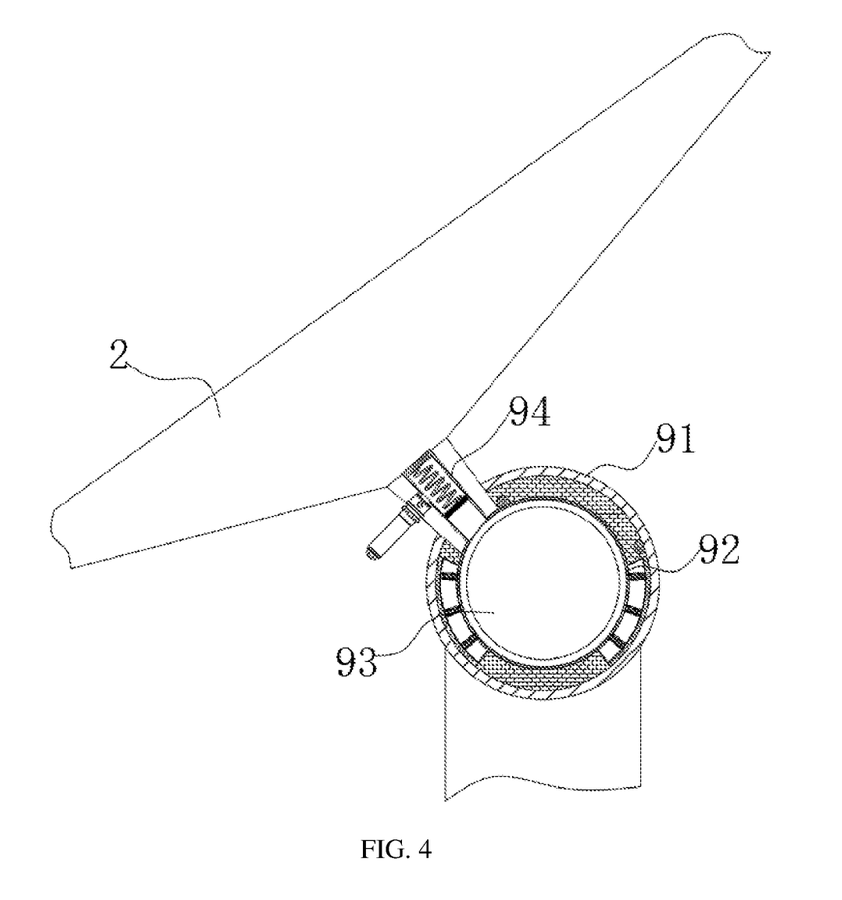
FIG. 4 is a schematic diagram of the structure of a self-adaptive angle adjusting assembly of the present disclosure.
Figure 5:
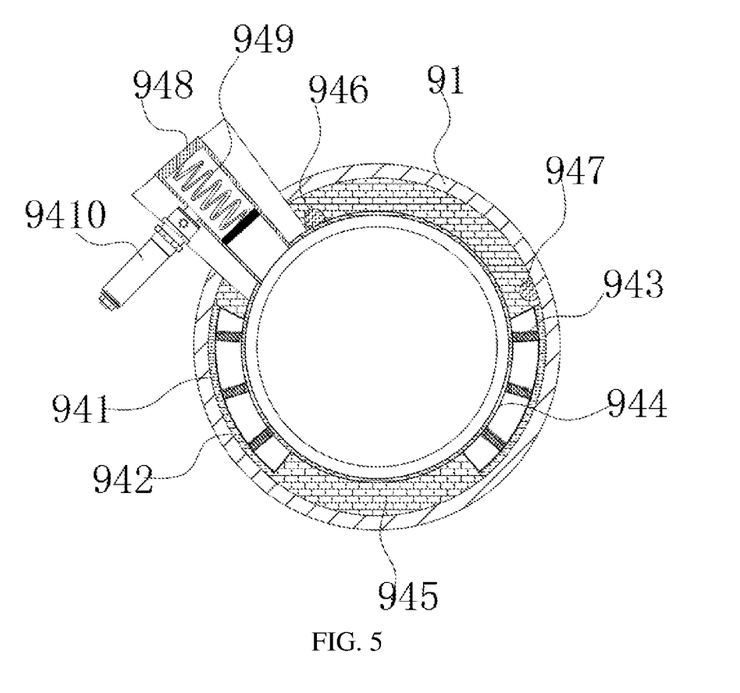
FIG. 5 is an enlarged partial view of FIG. 4.
Figure 6:
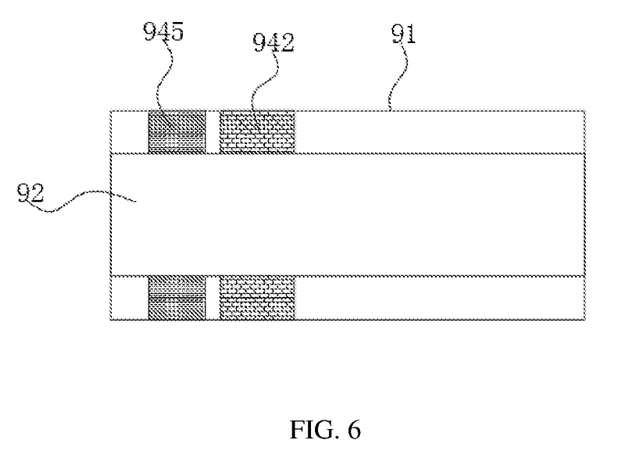
FIG. 6 is a schematic view showing an installation structure of a centralizing sleeve of the present disclosure.

In this embodiment, as shown in FIGS. 4-6, the damping adjusting assembly 94 includes an inflation bag 941, a brake pad 942, a damping adjusting cylinder 948 and an inflation fluid injector 9410. Two sets of inflation bags 941 are symmetrically attached to the outer surface of the angle adjusting cylinder 92. An inflation sealing cavity is formed between the angle adjusting cylinder 92 and the inner cylinder 93. The inflation bags 941 are communicated with the inflation sealing cavity through communication ports 944 formed in the angle adjusting cylinder 92. The inflation sealing cavity is filled with liquid, to control the degree of inflation of the inflation bag by the inflation sealing cavity 941.

The middle position of the inflation sealing cavity is communicated with the damping adjusting cylinder 948 fixed on the angle adjusting cylinder 92. A sealing plug is slidably arranged in the damping adjusting cylinder 948, and the sealing plug is connected with the bottom of the damping adjusting cylinder 948 through a return spring 949, so as to control the inflation degree of the inflation bag 941 through the sliding of the sealing plug. When the sealing plug slides away from the return spring 949, part of the liquid of the angle adjusting cylinder 92 is fed into the inflation bag 941, and the inflation bag 941 expands and compresses the fixing cylinder to increase the damping between the two and even achieve fixation.

Furthermore, one side, close to the return spring 949, of the damping adjusting cylinder 948 is embedded and communicated with the inflation fluid injector 9410, and the inflation fluid injector 9410 can inject or extract the inflation fluid with a thermal inflation coefficient into one side, close to the return spring 949, of the damping adjusting cylinder 948, so as to change an initial position of the sealing plug and the amount of the inflation fluid in the damping adjusting cylinder 948 in the initial state. It further includes a solar energy intensity detection sensor capable of feeding detection data back to the controller, and the controller is electrically connected with the inflation fluid injector. During implementation, the solar energy intensity detection sensor is used for detecting the illumination intensity. When the illumination intensity of the existing angle position where the heat collector is located is small, the inflation fluid injector is driven to extract part of inflation fluid from the damping adjusting cylinder 948 so as to drive the sealing plug to slide towards the direction of the return spring 949, which reduces the inflation degree of the inflation bag 941, and reduces the damping between the inflation bag 941 and the fixing cylinder. In turn, the heat collector 2 enables to continue to deflect under the drive of the center of gravity adjusting frame 3 until the solar energy intensity detection sensor detects that the illumination intensity of the angular position where the heat collector is located is large. Then the inflation fluid injector is driven to inject part of inflation fluid into the damping adjusting cylinder 948 to enable the sealing plug to slide away from the direction of the return spring 949. In addition, the inflation fluid in the damping adjusting cylinder 948 can be adjusted in small amplitude adaptively under illumination;

As a preferred embodiment, as shown in FIGS. 5 and 6, a plurality of sets of resistance-increasing springs 943 are uniformly distributed in the inflation bag 941.

The outer surface of an end part of the angle adjusting cylinder 92 is attached with a centralizing sleeve 945 arranged to keep off the inflation bag 941. The inner side of the centralizing sleeve abuts against the outer surface of the angle adjusting cylinder 92, and the outer side of the centralizing sleeve abuts against the inner surface of the fixing cylinder 91, improving the rotation stability of the angle adjusting cylinder 92 relative to the fixing cylinder 91.

As a preferred embodiment, the outer surface of the angle adjusting cylinder 92 is fixed with a limiting ball I 946, and the inner surface of the fixing cylinder 91 is fixed with a corresponding limiting ball II 947. The cooperation of the limiting ball I 946 and the limiting ball II 947 can limit the angle adjusting cylinder 92 to rotate within the range of 0°-90° relative to the fixing cylinder 92.

During implementation, by manually rotating and adjusting the heat collector 2 is once a day, one side, close to the center of gravity adjusting frame 3, of the heat collector 2 is raised and placed facing the sun, so that the heat collector will slowly deflect to an initial state over time, realizing the driving of near-zero energy consumption; and under the intervention of the damping adjusting assembly 94, the angular deflection of the heat collector 2 is suspended in a multi-point mode, so that the heat collector 2 can deflect along with the deflection of the sun, thereby collecting more heat. Wherein, the solar energy intensity detection sensor is used for detecting the illumination intensity. When the illumination intensity of the existing angle position where the heat collector is located is small, the inflation fluid injector is driven to extract part of inflation fluid from the damping adjusting cylinder 948 so as to drive the sealing plug to slide towards the direction of the return spring 949, which reduces the inflation degree of the inflation bag 941, and reduces the damping between the inflation bag 941 and the fixing cylinder. In turn, the heat collector 2 enables to continue to deflect under the drive of the center of gravity adjusting frame 3 until the solar energy intensity detection sensor detects that the illumination intensity of the angular position where the heat collector is located is large. Then the inflation fluid injector is driven to inject part of inflation fluid into the damping adjusting cylinder 948 to enable the sealing plug to slide away from the direction of the return spring 949.

The above are only the preferred specific embodiments of the present disclosure, but the scope of the present disclosure is not limited to this. For anyone skilled in the art, within the technical scope disclosed by the present disclosure, equivalent replacements or changes based on the technical solution and the inventive concept of the present disclosure should all be covered within the protection scope of the present disclosure.

What is claimed is:

1. A solar heat collection device for a near-zero energy consumption community, comprising a heat collection frame, a heat collector, a center of gravity adjusting frame and a self-adaptive angle adjusting assembly, wherein the heat collector is rotatably arranged on the heat collection frame through the self-adaptive angle adjusting assembly;

the center of gravity adjusting frame is fixed on one side of a bottom of the heat collector, so that the heat collector is driven to deflect by the center of gravity adjusting frame without interference;

the self-adaptive angle adjusting assembly comprises a fixing cylinder, an angle adjusting cylinder, an inner cylinder and a damping adjusting assembly; wherein the inner cylinder is coaxially fixed inside the angle adjusting cylinder; two ends of the angle adjusting cylinder are respectively coaxially and rotatably connected with the fixing cylinder; the angle adjusting cylinder is also connected with the heat collector; and the damping adjusting assembly is arranged between the angle adjusting cylinder and the fixing cylinder;

when collecting heat, a side, close to the center of gravity adjusting frame, of the heat collector is raised and placed facing sun, so that the heat collector will slowly deflect to an initial state over time; and under the intervention of the damping adjusting assembly, the angular deflection of the heat collector is suspended in a multi-point mode, so that the heat collector can deflect along with the deflection of sun, thereby collecting more heat.

2. The solar heat collection device for the near-zero energy consumption community of claim 1, wherein: cleaning guide rails are symmetrically fixed on the heat collector, and one through groove is opened in one cleaning guide rail; an arc-shaped rack with a same track as the cleaning guide rail is arranged in the through groove; a gear is meshed on the arc-shaped rack, and a cleaning roller is fixed between two sets of gears.

3. The solar heat collection device for the near-zero energy consumption community of claim 2, wherein: one gear is connected with an output end of a micro motor, and other gear is coaxially and fixedly connected with a limiting disc.

4. The solar heat collection device for the near-zero energy consumption community of claim 3, wherein: a limiting guide rail is further arranged on the cleaning guide rail close to the micro motor, a limiting rod is slidably arranged in the limiting guide rail, and the limiting rod is connected with the micro motor.

5. The solar heat collection device for the near-zero energy consumption community of claim 1, wherein: the heat collector is further provided with a light gathering pipe which is directly fixed; the light gathering pipe is a transparent pipe body, contained with cleaning liquid therein, and part of the cleaning liquid can be regularly sprayed out on the heat collector.

6. The solar heat collection device for the near-zero energy consumption community of claim 1, wherein: the damping adjusting assembly comprises an inflation bag, a brake pad, a damping adjusting cylinder and an inflation fluid injector; wherein two sets of inflation bags are symmetrically attached to an outer surface of the angle adjusting cylinder; an inflation sealing cavity is formed between the angle adjusting cylinder and an inner cylinder; the inflation bags are communicated with the inflation sealing cavity through communication ports formed in the angle adjusting cylinder; and the inflation sealing cavity is filled with liquid, to control a degree of inflation of the inflation bag by the inflation sealing cavity;

the middle position of the inflation sealing cavity is communicated with the damping adjusting cylinder fixed on the angle adjusting cylinder; a sealing plug is slidably arranged in the damping adjusting cylinder, and the sealing plug is connected with the bottom of the damping adjusting cylinder through a return spring, so as to control the inflation degree of the inflation bag through a sliding of the sealing plug.

7. The solar heat collection device for the near-zero energy consumption community of claim 6, wherein: one side, close to the return spring, of the damping adjusting cylinder is embedded and communicated with the inflation fluid injector, and the inflation fluid injector can inject or extract inflation fluid with a thermal inflation coefficient into one side, close to the return spring, of the damping adjusting cylinder, so as to change an initial position of the sealing plug and an amount of the inflation fluid in the damping adjusting cylinder in an initial state.

8. The solar heat collection device for the near-zero energy consumption community of claim 6, further comprising a solar energy intensity detection sensor capable of feeding detection data back to a controller, and the controller is electrically connected with the inflation fluid injector.

9. The solar heat collection device for the near-zero energy consumption community of claim 6, wherein: a plurality of sets of resistance-increasing springs are uniformly distributed in the inflation bag; and the outer surface of an end part of the angle adjusting cylinder is attached with a centralizing sleeve arranged to keep off the inflation bag; the inner side of centralizing sleeve abuts against the outer surface of the angle adjusting cylinder, and the outer side of the centralizing sleeve abuts against the inner surface of the fixing cylinder.

10. The solar heat collection device for the near-zero energy consumption community of claim 6, wherein: the outer surface of the angle adjusting cylinder is fixed with a limiting ball I, and the inner surface of the fixing cylinder is fixed with a corresponding limiting ball II; a cooperation of the limiting ball I and the limiting ball II can limit the angle adjusting cylinder to rotate within a range of 0°-90° relative to the fixing cylinder.

* * * * *